(12) United States Patent
Keech

(10) Patent No.: US 10,119,849 B2
(45) Date of Patent: Nov. 6, 2018

(54) METHOD AND SYSTEM FOR REPRODUCING AN INSTRUMENT'S CALIBRATION CERTIFICATE

(71) Applicant: ABB Schweiz AG, Baden (CH)

(72) Inventor: Ray Keech, Cirencester (GB)

(73) Assignee: ABB Schweiz AG, Baden (CH)

( * ) Notice: Subject to any disclaimer, the term of this patent is extended or adjusted under 35 U.S.C. 154(b) by 105 days.

(21) Appl. No.: 15/486,315

(22) Filed: Apr. 13, 2017

(65) Prior Publication Data

US 2017/0299413 A1 Oct. 19, 2017

(30) Foreign Application Priority Data

Apr. 18, 2016 (EP) .................................... 16165830

(51) Int. Cl.
G06F 11/30 (2006.01)
G01D 18/00 (2006.01)
H04Q 9/00 (2006.01)

(52) U.S. Cl.
CPC ......... *G01D 18/008* (2013.01); *G01D 18/002* (2013.01); *H04Q 9/00* (2013.01)

(58) Field of Classification Search
CPC .................................................... G01D 18/008
See application file for complete search history.

(56) References Cited

U.S. PATENT DOCUMENTS 6,823,277 B1 * 11/2004 Poulsen ............... G01D 18/006
702/105
2006/0047455 A1 * 3/2006 Catelani ............... G01D 18/006
702/85

* cited by examiner

*Primary Examiner* — Phuong Huynh
(74) *Attorney, Agent, or Firm* — Leydig, Voit & Mayer, Ltd.

(57) ABSTRACT

A method and a system for reproducing a calibration certificate of an electronic instrument having at least one electronic storage means, the method involving separating the calibration certificate data into a first subset of data, which is calibration specific, and a second subset of data, which is document descriptive; defining a set of meta data about the second subset of data; storing the first subset of data and the set of meta data in the instrument's electronic storage means; storing the second subset of data in a computing device separated from the electronic instrument; and reproducing the calibration certificate by uploading the first subset of data and the set of meta data to the computing device and reconstructing the calibration certificate from the uploaded first subset of data set of meta data and the second subset of data.

13 Claims, 3 Drawing Sheets

METHOD AND SYSTEM FOR REPRODUCING AN INSTRUMENT'S CALIBRATION CERTIFICATE

CROSS-REFERENCE TO RELATED APPLICATIONS

Priority is claimed to European Patent Application No. 16 165 830.7, filed on Apr. 18, 2016, the entire disclosure of which is hereby incorporated by reference herein.

FIELD

The invention relates to a method and a system for reproducing an electronic instrument's calibration certificate from said instrument, the electronic instrument having at least one electronic storage means.

BACKGROUND

Some electronic products, such as industrial or measuring instruments, have calibration certificates. These record a series of test runs and the measured result, along with details about the product, such as serial and model numbers. For example a flowmeter often has a flow calibration certificate recording a series of test runs and the measured result. Or a weigh scale will have a series of test weights applied and the measured result and error recorded. Traditionally such certificates of calibration are printed on paper and supplied with the electronic product. In many situations, the end user loses the calibration certificate, or it never reaches the required person, for example because it is being lost during commissioning. Although normally the manufacturer of the instrument stores copies of the original document, it is not always straightforward for the end user to get a duplicate. In some situations quality processes, inspections or audits will require this original calibration certificate or subsequent re-calibration to be available.

One possible way to ensure availability of required calibration certificates is to store an image or electronic record of the calibration certificate inside an electronic memory within the electronic product. Hereby an external computing device acts as a means of uploading, viewing, distributing and printing the internally stored calibration certificate. The drawback with this method is that for a typical one page certificate its size, would be too large for the very low capacity of electronic storage available in electronic products. Electronic instruments like industrial or measurement instruments typically have a very limited amount of non-volatile storage, about one to two k-bytes only. Whilst well know compression algorithms exist, such as jpeg or portable document formats such as pdf, for a typical one page calibration certificate its size, even if compressed, would be around 18 k bytes. This is still far too large for storage available in electronic instruments such as industrial or measurement instruments.

SUMMARY

An aspect of the invention provides a method for reproducing calibration certificate of an electronic instrument having at least one electronic storage unit, the method comprising: separating calibration certificate data into a first subset of data, which is calibration specific, and a second subset of data, which is document descriptive; defining a set of meta data about the second subset of data; storing the first subset of data and the set of meta data in the instrument's electronic storage unit; storing the second subset of data in a computing device separated from the electronic instrument; and reproducing the calibration certificate by uploading the first subset of data and the set of meta data to the computing device and reconstructing the calibration certificate from the uploaded first subset of data, the set of meta data, and the second subset of data.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 an example of a calibration certificate of an electronic instrument, illustrating the type of data and where it is re-generated or accessed from.

DETAILED DESCRIPTION

Figure 1:
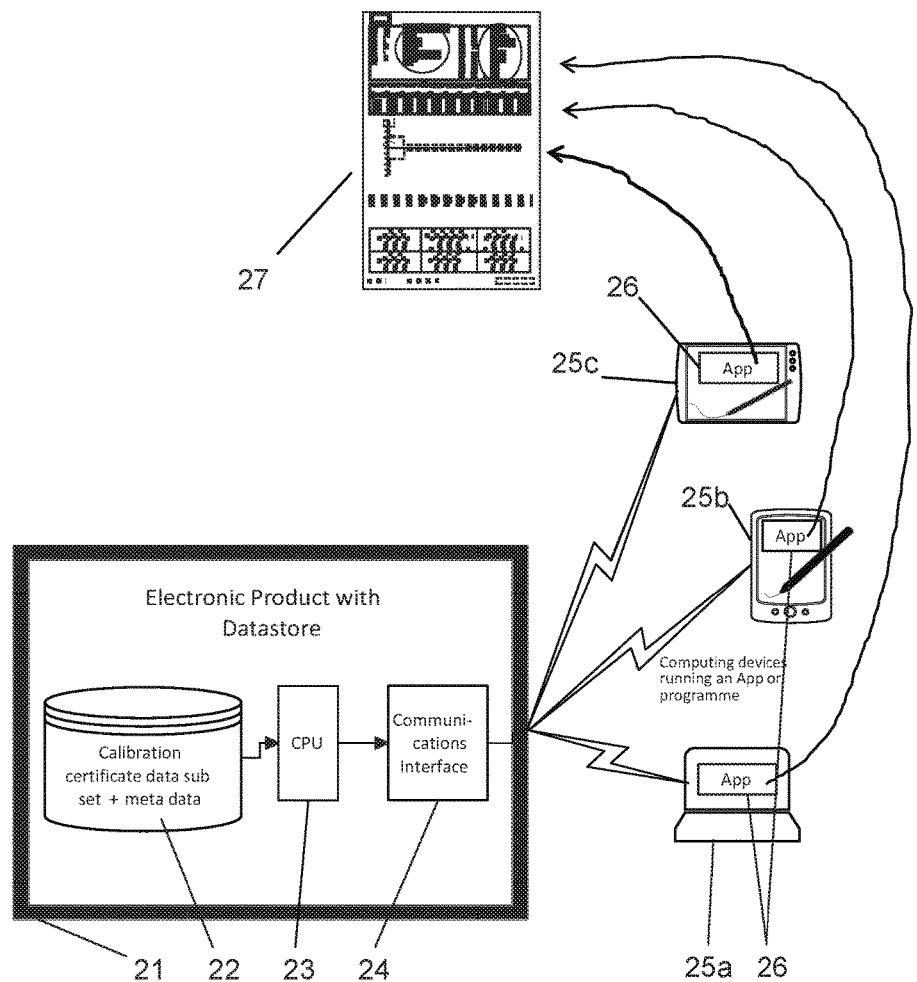
FIG. 1 a first embodiment of the invention.

So it is an aspect of the present invention to provide a method and a system to enable reproducing an electronic instruments calibration certificate from the electronic instrument, with significantly reduced storage requirement in the electronic instrument.

An aspect of the invention relates to a method and a system for reproducing an electronic instrument's calibration certificate from the instrument, the electronic instrument including at least one electronic storage means. An aspect of the invention relates to storage by electronic means of a calibration certificate within a product to which the calibration certificate belongs.

So according to an aspect of the invention, the method comprises the steps of separating the calibration certificate data into a first subset of data, which is calibration specific, and a second subset of data, which is document descriptive, defining a set of meta data about the second subset of data, storing the first subset of data and the set of meta data in the instrument's electronic storage means, storing the second subset of data in a computing device separated from the electronic instrument, reproducing the calibration certificate by uploading the first subset of data and the set of meta data to the computing device and reconstructing the calibration certificate from the uploaded first subset of data set of meta data and the second subset of data.

The method according to an aspect of the invention overcomes the problem of a lost or unavailable calibration certificate by storing the necessary information inside the product such that it can be reproduced or regenerated. It details how it is possible for an end user, inspector, auditor, service personnel or similar individual to reproduce the original or re-calibration certificate at a future date by electronic means from the electronic instrument product, taking into account the very limited amount of non-volatile storage in the electronic instrument.

According to an advantageous embodiment of the invention, the meta data indicates the calibration certificate layout, content and format.

According to an advantageous embodiment of the invention, the second subset of data is stored in an App or application program and contains the certificate of calibration template or templates, which contain layout, formatting and static content of the calibration certificate.

According to an advantageous embodiment of the invention, the App or application program has the ability to create dynamic content based on the first subset of data.

According to an advantageous embodiment of the invention, an image of a calibrator signature or calibrator mark is stored and then used by the App to incorporate on the regenerated calibration certificate.

According to an advantageous embodiment of the invention, the electronic product is an Industrial or Measuring Instrument.

According to an advantageous embodiment of the invention, the Industrial or Measuring Instrument's data store is separated into two physical parts, a sensor data store and a transmitter data store.

According to an advantageous embodiment of the invention, the communication link is integrated and built into the external computing device.

According to an advantageous embodiment of the invention, an App is used to re-calibrate the electronic product and store an updated calibration certificate contents into the product's data store.

According to an advantageous embodiment of the invention, an App is used to re-calibrate the electronic product and store a separate new data record or calibration certificate, leaving previous entries available.

According to an advantageous embodiment of the invention, a calibration certificate history or -record is stored and subsequently made available for later regeneration from the product's memory contents The method according to the invention uses a combination of a separate computing device, which in an advantageous embodiment may be a computer program or an application program for a portable electronic computing device, such as a Smartphone, such application programs being known as an App. The computer program or App according to the invention may be running on an external computing device, such as a tablet PC, a smartphone, a portable PC etc to regenerate the original calibration certificate.

The advantage of the method according to the invention lies in that storing data required for reproducing the calibration certificate within the electronic product requires only a minimal amount of data and meta data.

Meta data in this instance means data describing the data, for instance a certificate template, format, version number, or identifier.

The static, or fixed data and formatting, which forms the bulk of the size and content of the calibration certificate, is stored and generated from the external computing device running the App, which is controlled by the uploaded meta data.

This allows a user, running a suitable App, to connect to the electronic product, by some communication means, extract the small amount of data, its meta data and then for the App to regenerate the original calibration certificate. Once available on the external computing device running the App, it can then be reproduced, printed, emailed etc depending on the user's requirements for this document.

For many certificates of calibration the amount of data which actually needs to be stored within the electronic product in order that the calibration certificate can be regenerated from an App is small. Only this data would typically be stored in the non volatile memory with the electronic instrument product.

The present embodiments represent the best ways known to the applicants of putting the invention into practice. However, they are not the only ways in which this can be achieved, The present embodiments provide a method and apparatus for a person to be able to reproduce or regenerate by electronic means a calibration certificate, which is virtually identical to the original calibration certificate for a said electronic product, or a copy of the re-calibration certificate if one is performed.

FIG. 1 is a schematic illustration of an electronic product incorporating a data store which contains a sub set of the calibration certificate information along with certificate's meta data, such as the certificate layout template version number or/identifier. A means for uploading and re constructing the calibration certificate using an App running on an external computing device from the data uploaded from the product.

In the embodiment as illustrated in FIG. 1, the electronic product 21 is used in conjunction with an external computing device 25a, 25b, 25c, which can be of any form, such as a PC (25a), Smartphone (25b), Tablet (25c), PLC, Industrial Control system, Bus Master, SCADA etc. This device runs an App or application program 26. A small amount of data and meta data is stored within the electronic product's non-volatile file store 22. An internal CPU 23 and some form of communication interface 24 allows this data to be exchanged with any of the external computing devices 25a, 25b, 25c. The communication interface may take any form, either wired, optical or wireless. Examples of such common interfaces are RS232, RS485, HART, Modbus, Profibus, FF, Infrared, IrDA, USB, Bluetooth, Near Field Communication (NFC), WiFi, Zigbee, GSM, SMS, GPRS, WiMAX or Internet Protocol. FIG. 1 shows three external computing devices 25a, 25b, 25c. It is understood that this is for example only illustrating the variety of possible realizations for such external computing devices. It does certainly not mean that all three external computing devices according to the invention need to be used simultaneously. One of the possible variety of external computing devices is sufficient to perform the method according to the invention.

Figure 3:
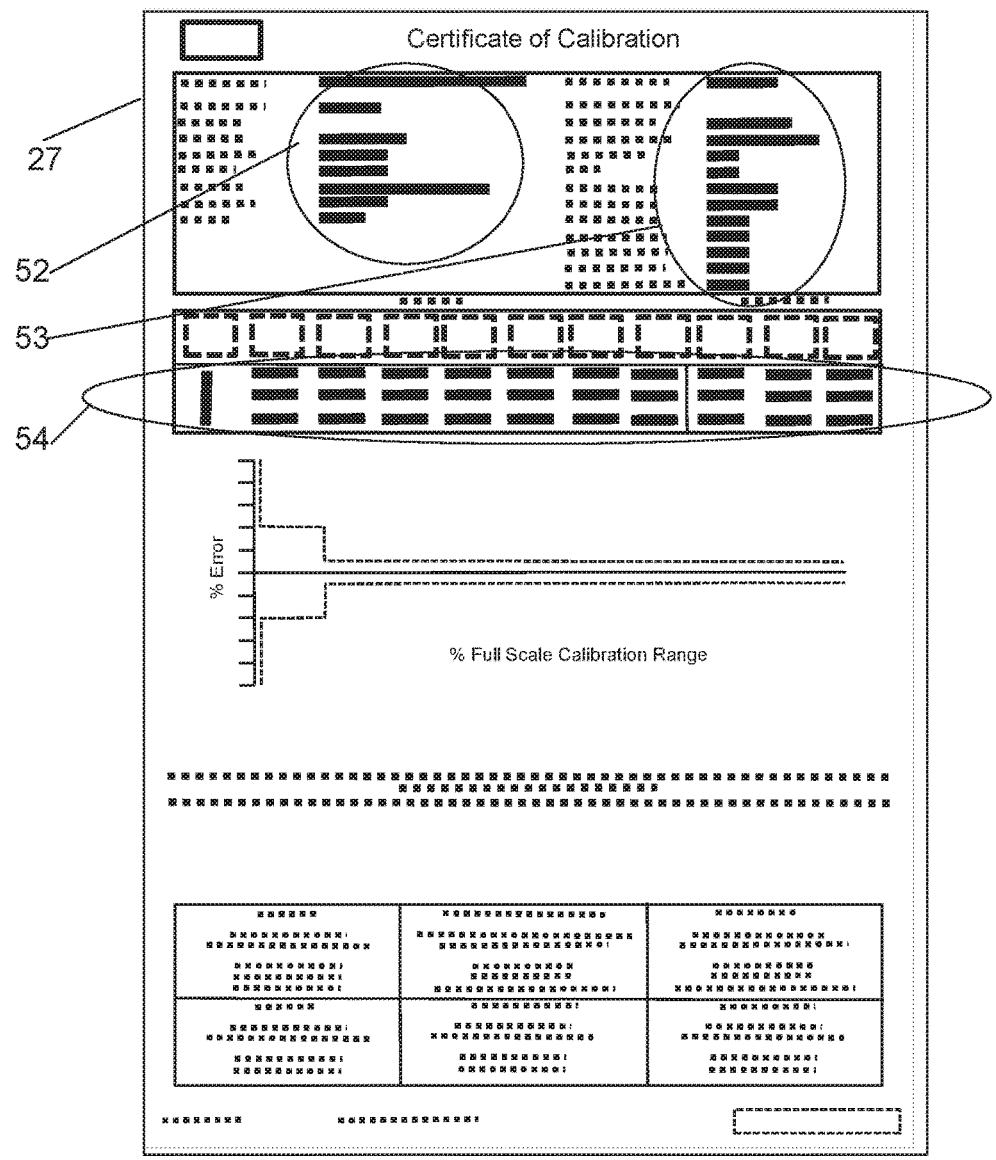

The small amount of data and meta data from file store 22, once uploaded into the App 26, is then used to regenerate the original calibration certificate 27, see FIG. 3, in an electronic form, such as Portable Document Format (pdf) or jpg image. Once in such a format or similar other formats, it is available for the user's purposes, such as printing or attaching to an audit or inspection report.

Figure 2:
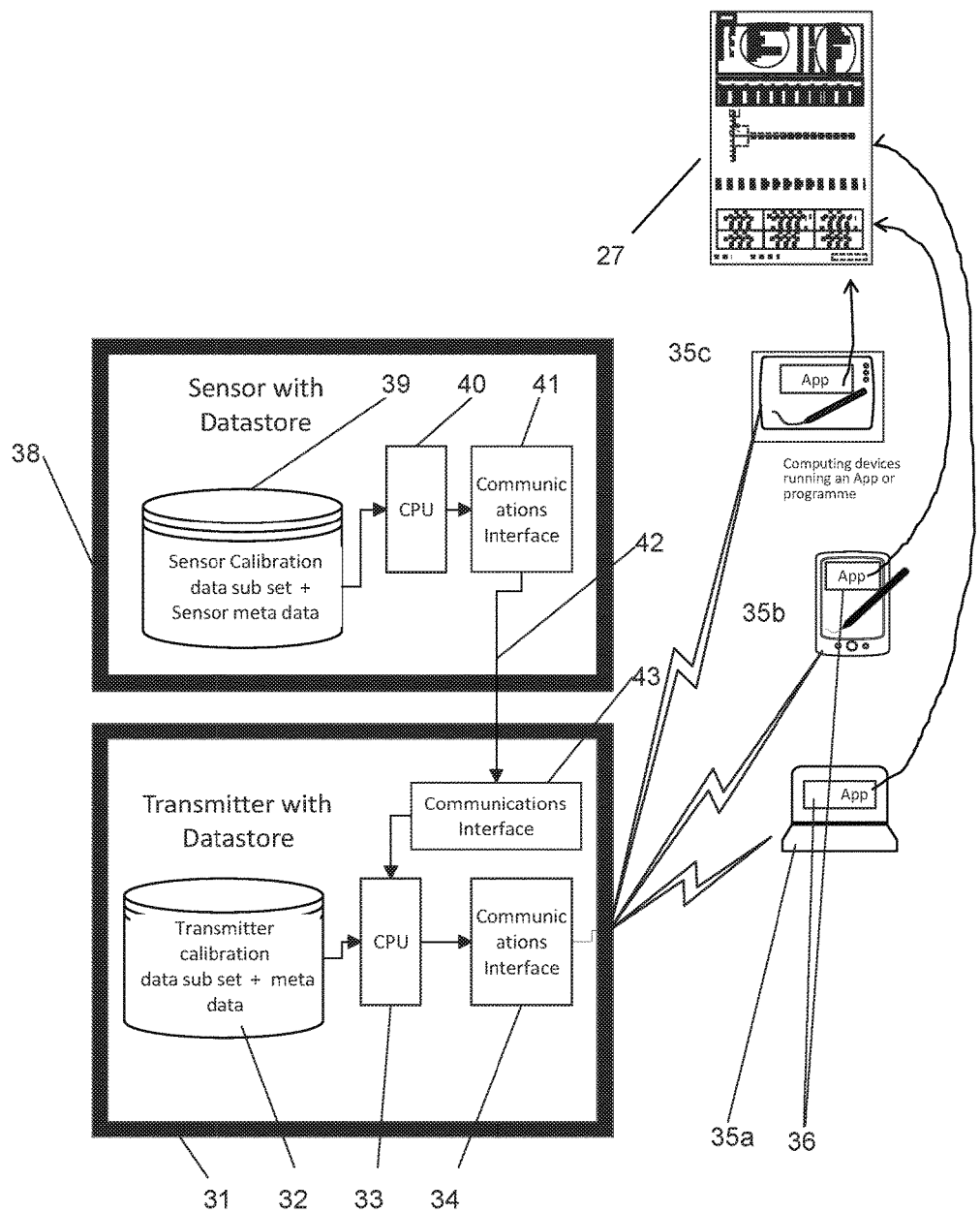
FIG. 2 a second embodiment of the invention.

In some products the electronics can be split between two or more assemblies. For instance in industrial instruments and measuring instruments, it is quite common for the electronics and the associated electronic storage memory to be split in two or more parts, for instance between transmitter and sensor electronics, or in another example in weigh scale and indicator. FIG. 2 is a schematic illustration of such an embodiment. The difference to the embodiment shown in FIG. 1 lies in that the electronic product's data store is split into two parts, with the data distributed between the sensor's and transmitter's data stores. In such a design the electronic store of the necessary information can be split or distributed between the product's parts. For instance the sensor may contain all of the information for the sensor calibration. As an example of this may be a pH electrode or electromagnetic flow meter sensor, both of which contain an electronic memory with this calibration certificate information stored. In this way, if for example a transmitter is replaced, the sensor still contains the original sensor calibration information, enabling a calibration certificate for the sensor to be regenerated. Similarly of course for a transmitter calibration certificate.

In the embodiment shown in FIG. 2, the sensor or sensing probe 38 is separated from the transmitter 31. The sensing probe 38 has a sensor data storage means 39, a sensor CPU 40 and a sensor communications interface 41. The transmitter 31 has a transmitter data storage means 32, a transmitter CPU 33, a first communications interface 43 for enabling communication with the sensor communications interface 41, applying a communication link 42. The transmitter 31 further has a second communications interface 34 for enabling communication with an external computing device 35a, 35b, 35c, which can be of any form, such as a PC (35a), Smartphone (35b), Tablet (35c), PLC, Industrial Control system, Bus Master, SCADA etc.

FIG. 2 shows three external computing devices 35a, 35b, 35c. It is understood that this is for example only illustrating the variety of possible realizations for such external computing devices. It does certainly not mean that all three external computing devices according to the invention need to be used simultaneously. One of the possible variety of external computing devices is sufficient to perform the method according to the invention.

The data stored in the sensor data storage means 39 of the sensing probe 38 is made available to the CPU 33 in the transmitter 31 via the communication link 42 and associated interfaces 41, 43 and the sensor CPU 40. The full data and meta data from the two data stores 32 and 39 required by the App 36, running on an external computing device 35a, 35b, 35c, to reconstruct the calibration certificate 27, see FIG. 3, is hence available via communication interface 34.

By storing within sensor 38, in data store 39, the relevant calibration parameters for this sensor are stored, for example calibration factors, calibration date, calibration test runs/input etc. This supports interchangeable sensors, such as for example a smart pH electrode, a smart flow meter sensor or a smart weigh scale.

By storing within the transmitter 31, in data store 32 the relevant calibration parameters for this transmitter, for example current output calibration factors, calibration date, transmitter span and zero etc, are stored. This supports interchangeable transmitters, whilst still having the capability, via the mechanism described above, to generate or regenerate a combined certificate of calibration 27, see FIG. 3.

The illustration in FIG. 3 shows an example of a calibration certificate 27 of an electronic instrument, illustrating the type of data and where it is re-generated or accessed from. It illustrates how according to the invention a significant reduction in data that have to be stored in the electronic product in order to generate the calibration certificate can be achieved.

The circled data in 52, 53 and 54 is in this case the main data that has to be stored within the electronic product 21, 31, 38, see FIGS. 1 and 2, in order that a calibration certificate can be generated by an App 26, 36, see FIGS. 1 and 2.

The non-circled information in calibration certificate 27 is static and is generated by the App 26, 36 from its code. In order that the App can support many products and certificate formats, the App will need knowledge of the certificate layout, content and format required to be generated or regenerated. This is conveyed by additional simple meta data stored in data storage means 22, 32 and 39, see FIGS. 1 and 2. This may be a simple index number or identifier for example, for which the App 26, 36 has a series of templates pre-programmed and uses the appropriate template defined by this meta-data. Some of the non-circled information in calibration certificate 27 may be dynamic and computed by the App 26, 36 from its code, for example an accuracy calibration graph, being calculated and formatted based on the meta data stored in data storage means 22, 32 and 39, see FIGS. 1 and 2 plus the main data which contain the calibration test point data 52, 53 and 54.

The key benefit of the above invention and embodiments is the large reduction in data that has to be stored in storage means 22, 32 and 39. In order to generate or regenerate the calibration certificate 27 from the information stored by the electronic product 21, 31, 38. For example in the certificate illustrated in FIG. 3, the amount of storage in one exemplary example only is less than 300 bytes, whereas a compressed image of the full calibration certificate image is around 18 k bytes. So the method according to the invention achieves a reduction by a factor of 60. For many electronic products having a limited non-volatile storage available, it means that the method according to the invention now makes possible the ability to produce calibration certificates from local electronic storage of data within the product.

A further embodiment, not shown in the figures, is for a signature or similar calibrator individual's mark to be digitally stored within the data stores 22, 32 or 39. The signature can be stored as a bitmap, or a compressed format, such as jpg or png and then incorporated into the final generated or regenerated calibration certificate 27.

A further embodiment is for the external computing device 25a, 25b, 25c, 35a, 35b, 35c to be an Industrial control system, PLC or Bus Master running any protocol such as HART, Profibus, FF.

A further embodiment is to support re-calibration of the product, for instance with a weigh scale and load cells where regular recalibration is necessary. Here the App 26, 36 can be used to enter a new calibration record/certificate directly into the data storing means 22, 32, 39 of the electronic product 21, 31, 38. This new calibration record could over write the original records or create a new entry. With the latter the electronic product could contain a complete calibration history since it was manufactured, including all re-calibrations. Such records are often valuable for Quality Audit trails.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS

21 Electronic product
22 Non volatile file store
23 Internal CPU
24 Communication interface
25a External computing device, PC
25b External computing device, smartphone
25c External computing device, tablet
26 App, application program
27 Calibration certificate
31 transmitter
32 Transmitter storage means
33 Transmitter CPU
34 Second communication interface
35a External computing device
35b External computing device
35b External computing device
38 Sensor, sensing probe with datastore
39 Sensor data storage means
40 Sensor CPU
41 Sensor communications interface
42 Communication link
43 Sensor/Transmitter communications interface
52 Main data
53 Main data
54 Main data

The invention claimed is:

1. A method for reproducing calibration certificate of an electronic instrument having at least one electronic storage unit, the method comprising:
   separating calibration certificate data into a first subset of data, which is calibration specific, and a second subset of data, which is document descriptive;
   defining a set of meta data about the second subset of data;
   storing the first subset of data and the set of meta data in the instrument's electronic storage unit;
   storing the second subset of data in a computing device separated from the electronic instrument; and
   reproducing the calibration certificate by uploading the first subset of data and the set of meta data to the computing device and reconstructing the calibration certificate from the uploaded first subset of data, the set of meta data, and the second subset of data.

2. The method of claim 1, wherein the meta data indicates a calibration certificate layout, content, and/or format.

3. The method of claim 1, wherein the meta data indicates a calibration certificate layout, content, and format.

4. The method of claim 1, comprising:
   storing the second subset of data in an App or application program,
   wherein the second subset of data includes a certificate of calibration template or templates, which contain layout, formatting, and static content of the calibration certificate.

5. The method of claim 3, wherein the App or application program has the ability to create dynamic content based on the first subset of data.

6. The method of claim 3, comprising:
   storing an image of a calibrator signature or calibrator mark, which is then used by the App to incorporate on a regenerated calibration certificate.

7. The method claim 1, where the electronic product is an industrial or measuring instrument.

8. The method of claim 7, further comprising:
   separating a data store from the industrial or measuring instrument into two physical parts, including a sensor data store and a transmitter data store.

9. The method of claim 8, further comprising:
   integrating and building in the communication link into an external computing device.

10. The method of claim 1, further comprising:
    recalibrating, using an App, the electronic product; and
    storing updated calibration certificate contents into the product's data store.

11. The method of claim 1, further comprising:
    recalibrating, using an App, the electronic product; and
    storing a separate new data record or calibration certificate, leaving previous entries available.

12. The method of claim 11, further comprising:
    storing a calibration certificate history or record; and
    subsequently, making the calibration certificate history or record available for later regeneration from memory contents of the product.

13. A system for reproducing a calibration certificate of an electronic instrument having at least one electronic storage unit, the system comprising:
    an external computing device,
    wherein the system is configured to execute the method of claim 1.

* * * * *